Dec. 21, 1954   L. G. CHEATUM ET AL   2,697,358
AUXILIARY DRIVE FOR CROP-HANDLING MACHINES
Filed Aug. 3, 1953   2 Sheets-Sheet 1

INVENTORS
L. G. Cheatum &
N. W. Summers
BY
Attorney

Dec. 21, 1954    L. G. CHEATUM ET AL    2,697,358
AUXILIARY DRIVE FOR CROP-HANDLING MACHINES
Filed Aug. 3, 1953    2 Sheets-Sheet 2

INVENTORS
L.G. Cheatum &
N.W. Summers
BY
Attorney

United States Patent Office 2,697,358
Patented Dec. 21, 1954

2,697,358

AUXILIARY DRIVE FOR CROP-HANDLING MACHINES

Leo G. Cheatum and Neil W. Summers, Ottumwa, Iowa, assignors to Deere Manufacturing Co., Dubuque, Iowa, a corporation of Iowa Application August 3, 1953, Serial No. 371,982

4 Claims. (Cl. 74—116)

This invention relates to an auxiliary driving mechanism for a crop-handling machine. More particularly, the invention relates to a drive attachment for a farm elevator of the blower type, such machines being used conventionally in the unloading of material from wagons and the transferring of such material to silos or other storage structures.

A typical machine of the character referred to (a representative example of which may be found in the U. S. patent to Zollars and Berry 2,639,949) will comprise an auger-equipped trough into which material is dumped from wagons or trailers backed up to the machine. The auger feeds this material into a blower housing in which a rotor propels the material tangentially upward for ultimate receipt by a storage building or equivalent receptacle. In some instances, the wagons are equipped with dump bodies, and in other instances a special hoist is provided for elevating the front end of the wagon so that the contents thereof slide into the material-receiving trough. In still other cases, the wagon is furnished with unloading mechanism such as a false endgate that is positioned at the front end of the wagon before the wagon is loaded. Means is provided for moving the endgate intermittently or slowly to the rear so that roughly measured quantities of the material are discharged into the trough. The present invention is concerned primarily with means for driving the wagon-unloading means of the type just referred to. Fundamentally, power for the unloading means may be taken from the crop-handling machine, which is an expedient not unknown to prior inventors.

One of the principal objects of the invention is to provide an improved driving mechanism, particularly one that may be used at either side of the crop-handling machine; that is to say, an attachment that is selectively positionable so that the wagon to be unloaded may be driven up to the auger trough from either side. Other objects of the invention reside in the over-all improvement in design and simplicity and economy in operation.

Still other important objects and desirable features inherent in and encompassed by the invention will become apparent as a disclosure of a preferred embodiment of the invention is made in the following detailed description and accompanying sheets of drawings.

Figure 1:
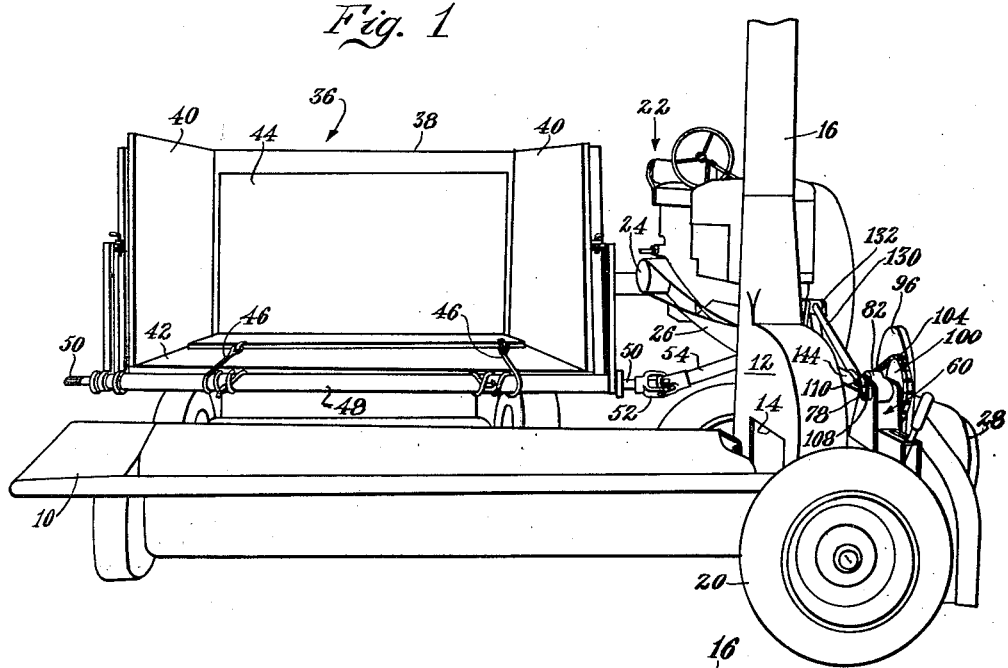
Fig. 1 is a general perspective view showing the association of the blower or crop-handling machine with a wagon equipped with unloading means.
Figure 2:
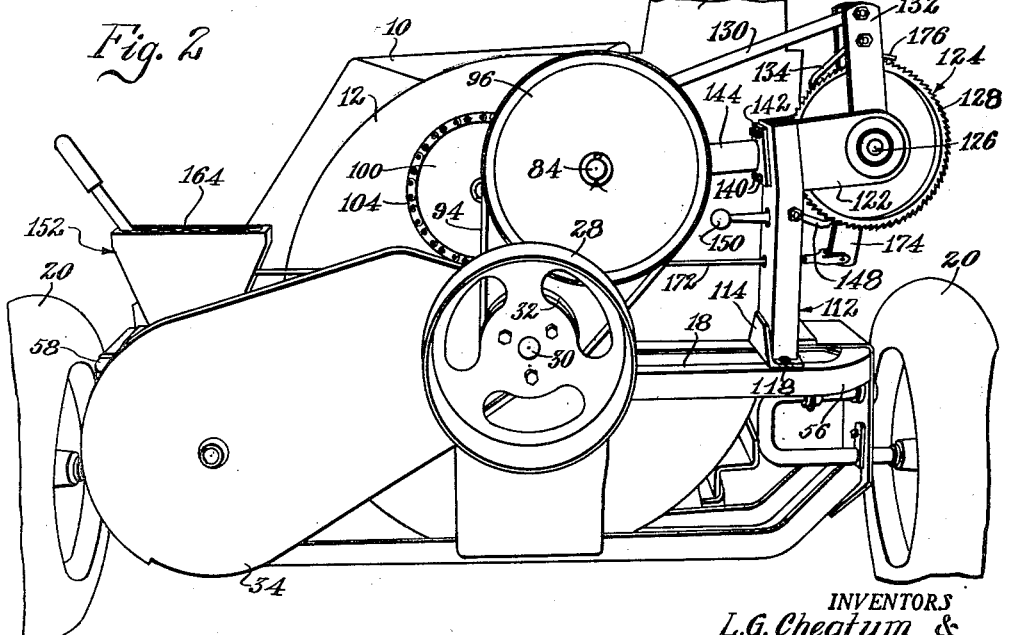
Fig. 2 is a perspective view, on an enlarged scale, and as seen from the front, of the crop-handling machine equipped with the improved auxiliary driving mechanism.
Figure 3:
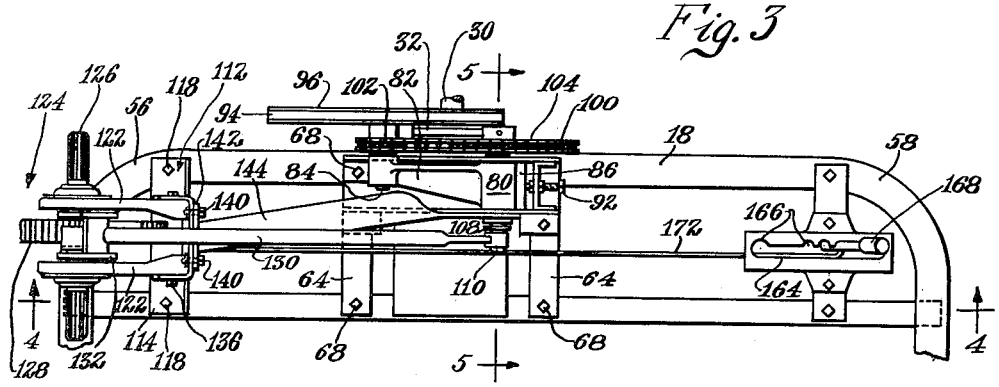
Fig. 3 is a plan view, on a scale approximately that of Fig. 2, showing the mounting of the auxiliary driving mechanism on the blower or crop-handling machine frame.

Familiarity with the basic structure of the crop-handling machine or blower will be assumed. Therefore, the description of the machine will be somewhat general. As is somewhat conventional, the machine comprises a material-receiving trough 10 equipped with an auger (not shown here) which operates to move the received material to the right (as seen in Fig. 1) into a blower housing 12. The numeral 14 represents the material inlet to the blower housing. The blower housing contains therein an appropriate rotor (not shown) which rotates in a counterclockwise direction, as seen in Fig. 2, to propel the received material tangentially upwardly through a discharge conduit 16.

The machine includes appropriate supporting structure comprising, among other things, an elongated horizontal frame 18 and supporting wheels 20 at opposite ends of the frame. These wheels are useful in moving the machine about before and after it is set up for association with a power source and wagons to be unloaded. In normal operation, the machine is stationary and the wagons are driven up to it.

A tractor, indicated generally by the numeral 22, appears in Fig. 1 as representative of means for driving the rotor in the blower housing 12. The tractor has a typical belt pulley 24 from which power is transmitted via a driving belt 26 to a belt pulley 28 keyed to a shaft 30 to which the rotor (not shown) is connected. Also keyed to the rotor or belt pulley shaft 30 is a double sheave 32, one groove of which is associated with means for driving the auger in the trough 10. In the present case, the driving means just referred to is hidden behind a shield 34, but such means is deemed to be without significance here and therefore is not disclosed.

The wagon is designated generally by the numeral 36 and has a front wall 38, opposite side walls 40 and a floor or bottom 42. The rear or discharge end of the box made up by the walls and floor (facing the observer in Fig. 1) is normally closed by an endgate. This endgate has been removed to expose the unloading mechanism, which is shown here as comprising a false endgate 44 movable rearwardly by a pair of flexible members or ropes 46 connected thereto and wrapped around a transverse rotatable member 48 at the rear of the wagon box floor 42. It will be obvious that material loaded into the wagon behind the false endgate 44 will be moved to the rear when the member 48 is rotated. Opposite ends of the rotatable member 48 have splined stub shafts 30 and one of these is shown as having fixed thereto one yoke of a universal joint 52 which forms part of a flexible power-transmitting shaft 54. According to the present invention, and even as broadly known to the art, power is transmitted from the blower or crop-handling machine to the rotatable member 48 via the flexible shaft 54. The novel mechanism forming the subject matter of this application will now be described.

As previously indicated, the crop-handling machine has the supporting structure that includes the horizontal frame 18. This frame has opposite ends which, for convenience, will be designated by the numerals 56 and 58.

Figure 4:
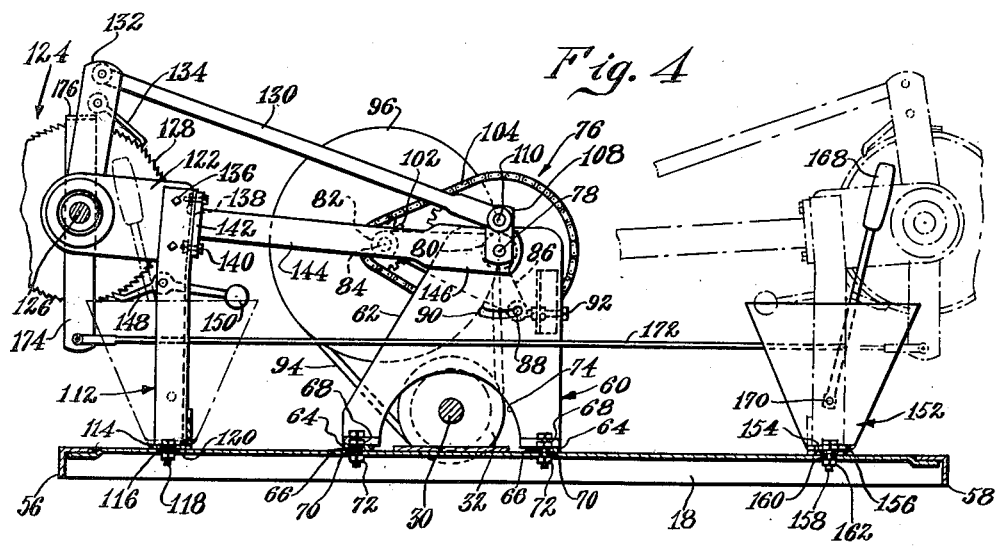
Fig. 4 is a sectional view as seen substantially along the line 4—4 of Fig. 3.
Figure 5:
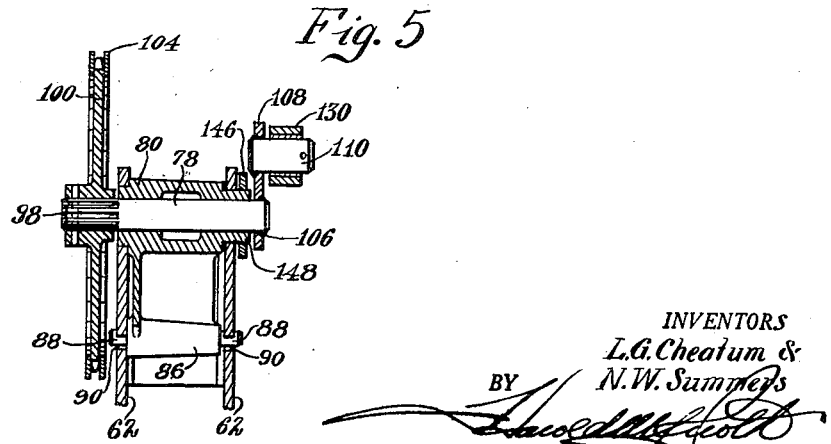
Fig. 5 is a sectional view, drawn on an enlarged scale, as seen along the line 5—5 of Fig. 3.

The auxiliary attachment has a central support 60 comprising a pair of upright parts or legs 62 spaced apart in a direction transverse to the length of the horizontal frame 18. The lower parts of the legs 62 are rigidly cross connected at 64 and the portions 64 are apertured at 66 to receive bolts 68, thus provding the central support 60 with means for the affixation thereof to the horizontal frame 18. The frame is drilled or otherwise provided with spaced apart apertures 70 at central portions thereof for receiving the bolts 68. Nuts 72 on the bolts complete the mounting means. As shown in Fig. 4, the upright parts or legs 62 are cut away at 74 to accommodate the rotor or belt pulley shaft 30, said shaft constituting a driving member for connection to input means 76 carried by the central support 60.

The input means comprises a first shaft or rotatable driven member 78 journaled in and extending between upper portions of the upright legs 62 via an adjusting bracket 80. This bracket is in the form of a bell crank, having a first arm 82 in which is fixed a second shaft 84 parallel to the first shaft 78. The bracket has a second arm 86 which carries a pin 88 capable of traveling in arcuate slots 90 provided respectively in the legs 62. An adjusting screw 92 abuts the arms 86 and provides means for varying the distance between the shaft 84 and the rotor shaft 30, thereby providing means for adjusting the tension on a driving belt 94 trained about the other groove of the double sheave 32 and a larger sheave 96 journaled on the input shaft 84.

The forward end of the shaft 78 is splined at 98 to effect a driving connection with a relatively large sprocket 100. A somewhat smaller sprocket 102 is welded or otherwise secured to the sheave 96 and is thus carried by the input shaft 84. A chain 104 establishes a driving connection between the two sprockets. The opposite or rear end of the shaft 78 has rigidly secured thereto, as by welding at 106, part of a power-transmitting means, this particular part taking the form of a crank 108 having a crank pin 110.

Another basic part of the auxiliary driving attachment comprises a first outer support 112 that has a base 114 provided with disconnectible means for effecting the mounting thereof on the horizontal frame 18, this means including appropriate apertures 116 in the base 114 and mounting bolts 118. The frame 18 is provided with cooperating means in the form of registering apertures for receiving the bolts 118. The support 112 extends upwardly from the base 114 and has rigidly affixed to its upper end a pair of bracket members that project outwardly portion or in the direction of the length of the horizontal frame. These bracket members 122 are apertured in alinement and are provided with suitable bearings for carrying output means designated generally by the numeral 124. This means comprises a double-ended output shaft 126 keyed to a ratchet wheel 128 that lies between the bracket members 122. Either end of the output shaft 162 may be connected to the power-transmitting shaft 54, depending upon the position of the auxiliary attachment on the frame 18, as will hereinafter be brought out in greater detail.

The crank 108 on the driven shaft 78 and the output means 124 are operatively connected by power-transmitting means comprising a pitman 130 connected at one end to the crank pin 110 and at its other end to a swinging arm 132 journaled on the double-ended output shaft 126. The arm 132 carries a driving pawl 134 that is intermittently engageable with the teeth on the ratchet wheel 128. That is to say, as the crank 108 is continuously rotated, the arm 132 is oscillated to impart intermittent or step-by-step rotation to the ratchet wheel 128. Thus, with the one end or the other of the output shaft 126 connected to the rotatable member 48 of the wagon via the flexible power-transmitting shaft 54, the rotatable member 48 is rotated in a direction to wrap up the ropes or flexible members so that the false endgate 44 moves toward the trough 10 to discharge material into the trough in increments or roughly measured amounts, depending upon the type and fluency of the material.

The bracket members 122 may be rigidly secured, as by bolts 136, to the upright first outer support 112. In addition, the upper portion of this support is provided with a plurality of tapped apertures 138 that respectively receive cap screws 140 passed through a flange 142 at the outer end of a brace arm 144. The inner end 146 of the arm is pivotally connected to the central support 60 coaxially with the driven shaft 78. In the preferred embodiment of the invention illustrated here, the inner end 146 of the arm 144 is mounted on the shaft 78 via a reduced hub or extension 148 of the bell crank bracket comprising the arms 82 and 86. The arm 144 is a relatively strong tension and compression member and thus adequately braces the outer support 112 from the central support 60, thereby fixing the distance between the upper end portions of those two supports. Since the cap screws 140 may be removed, they constitute removable or disconnectible securing means between the arm 144 and the first outer support 112. It will be obvious, of course, that equivalent removable securing means could be used.

The first outer support pivotally carries a holding pawl 148 having a biased or weighted handle 150. The holding pawl performs its usual function in preventing retrograde motion of the ratchet wheel 128, the weight in the handle 150 serving to keep the pawl 148 in engagement with the teeth of the ratchet wheel. A spring could be added if desired. The handle serves, however, as means for releasing the holding pawl so that slight retrograde movement of the ratchet wheel may be had in instances when it is desired to disconnect the flexible power-transmitting shaft 54 under circumstances in which torsional forces imposed on the rotatable member 48 because of load transmitted through the ropes 46 would otherwise make it impossible to disconnect the shaft 54 at either of the splines 50 or 126.

Another part of the attachment comprises a second outer support, designated generally by the numeral 152. This support comprises a base portion 154 apertured at 156 to receive securing means in the form of bolts 158. The end portion 58 of the horizontal frame 18 has means in the form of apertures 160 for receiving the bolts 158, thus constituting means for removably mounting the second outer support 152 on the frame 18. Nuts 162 on the bolts 158 complete the assembly. The support 152 is in the form of a funnel shaped member having its upper end provided with a slot 164 along one side of which are a plurality of notches 166. A control lever 168 is pivoted at its lower end at 170 to a lower portion of the support 152 and projects upwardly through the slot 164 to dispose its handle within easy reach of the operator of the machine. The handle 168 comprises part of control means for controlling the power-transmitting means between the input means 76 and the output means 124. Other portions of the control means comprise a link 172 connected at one end to the handle 168 and at its other end to a lever 174 rockably mounted on the double-ended output shaft 126. The upper end of the lever 174 has a flange 176 thereon which may be adjustably positioned beneath the driving pawl 134. The throw of the driving arm 132 is uniform, but the position of the flange 176 on the adjusting or control lever 174 will determine at what point the pawl 134 will engage the teeth of the ratchet wheel 128, thereby permitting variation in the angular movement of the ratchet wheel. This is not unconventional construction, being illustrated in the U. S. Patent to Brown 1,215,614. The notches 166 along one edge of the slot 164 in the support 152 are for the purpose of maintaining any selected position of the lever 168.

*Operation*

The blower or equivalent crop-handling machine is normally or conventionally sold without any means for transmitting power to auxiliary devices such as the unloading wagon illustrated here. Therefore, it is necessary that some form of attachment be utilized. That disclosed here lends itself very well as an expedient for transmitting power from the blower to the auxiliary mechanism. As already indicated, the present attachment has various features, among which is the selective interchangeability of the first and second outer supports so that the wagon, for example, may be driven up to either side of the blower and connected to the auxiliary driving mechanism. As shown in full lines in Fig. 4, the first outer support 112 is rigidly but removably mounted at the end 56 of the horizontal frame 18, it being necessary when purchasing or acquiring the attachment to drill the frame 18 at 120 and at 160 to provide means for mounting the supports 112 and 152; although, machines designed especially for the attachment could have these holes provided in manufacture. With the support 112 mounted at the end 56 of the frame 18, the other support 152 is mounted at the other end 58 of the frame. The mounting means for the supports are equidistant from the pivot established by the driven shaft 78 and the central support 60 remains fixed. When it is desired to interchange the supports 112 and 152, the support 112 is first disconnected from the brace arm 144; then the two supports 112 and 152 are removed from their respective ends of frame 18, their positions reversed and reconnection effected. It is not necessary to disconnect the control link 172 between the control means and the output means 124. Also, as will be seen, reversing the positions of the supports leaves the link 172 clear of the central support 60, the central support being offset sufficiently to accommodate the new position of the control link. When the first outer support 112 occupies its new position at the end 58 of the frame 18, the brace arm 144 is pivoted about its end 146 on the shaft 78 so that it occupies the broken-line position of Fig. 4, after which the cap screws 140 are replaced and drawn up tight to again brace the support 112 from the central support 60. Pivoting of the brace arm 144 to the central support 60 is entirely independent of the bracket 80 and therefore the driving mechanism or input means need not be disturbed. Functioning of the output means 124 will be the same at either side or end of the frame 18. Since the shaft 126 is double-ended, the flexible power-transmitting shaft 54 to the wagon may be easily connected to whichever end of the shaft 126 is available.

All of the foregoing may be readily accomplished merely by removing the relatively few bolts and/or cap screws at 118, 140 and 158. Regardless of the relative positions of the supports 112 and 152, none of the operating efficiency or design simplicity of the attachment is lost.

Various features of the invention not specifically enumerated will undoubtedly occur to those versed in the art, as will divers modifications in the preferred embodi-

What is claimed is:

1. For a crop-handling machine having a horizontal frame including opposite ends and a centrally located driving member rotatable on a horizontal axis transverse to the frame: selectively positionable auxiliary driving mechanism comprising a central support having a pair of upright legs spaced apart transversely of the length of the frame and a lower portion joining said legs and provided with means for affixing said support to a central portion of the frame; rotatable power input means carried by the central support and including a first shaft journaled in and extending across upper portions of the support legs on a horizontal axis transverse to the length of the frame; a bracket adjustable about the first shaft and positioned between said legs and a second shaft journaled in the bracket in offset relation to the first shaft and connectible to the driving member; first and second outer supports alined with the central support lengthwise of the frame and disposed respectively adjacent to opposite ends of the frame equidistantly from the aforesaid shaft, each of said first and second supports having disconnectible means mounting the respective support on the associated end of the frame; power-output means journaled on the first support; controllable power-transmitting means drivingly connecting the aforesaid first shaft and the output means; control means carried by the second outer support and operatively associated with the power-transmitting means; a brace arm having inner and outer ends and arranged with its inner end alongside one of the legs of the central support and pivoted on said central support coaxially with the first shaft and independently of the bracket and having its outer end proximate to the first support; and securing means connecting the outer end of the brace arm to the first support, said securing means being disconnectible so that the outer supports may be removed and replaced on the frame in interchanged relation and the brace arm may be swung about the first shaft to dispose its outer end at the other end of the frame for reconnection to the newly positioned first support.

2. For a crop-handling machine having a horizontal frame including opposite ends and a centrally located driving member rotatable on a horizontal axis transverse to the frame: selectively positionable auxiliary driving mechanism comprising a central support having an upright part provided with means for affixation thereof to a central portion of the frame; rotatable power input means carried by the upright part and including a first shaft journaled in the upper part on a horizontal axis transverse to the length of the frame; a bracket adjustable about the first shaft and a second shaft journaled in the bracket in offset relation to the first shaft and connectible to the driving member; first and second outer supports alined with the central support lengthwise of the frame and disposed respectively adjacent to opposite ends of the frame equidistantly from the aforesaid first shaft, each of said first and second supports having disconnectible means mounting the respective support on the associated end of the frame; power-output means journaled on the first support; controllable power-transmitting means drivingly connecting the aforesaid first shaft and the output means; control means carried by the second outer support and operatively associated with the power-transmitting means; a brace arm having inner and outer ends and arranged with its inner end alongside the upright part of the central support and pivoted on said central support coaxially with the first shaft and independently of the bracket and having its outer end proximate to the first support; and securing means connecting the outer end of the brace arm to the first support, said securing means being disconnectible so that the outer supports may be removed and replaced on the frame in interchanged relation and the brace arm may be swung about the first shaft to dispose its outer end at the other end of the frame for reconnection to the newly positioned first support.

3. For a crop-handling machine having a horizontal frame including opposite ends and a centrally located driving member rotatable on a horizontal axis transverse to the frame: selectively positionable auxiliary driving mechanism comprising a central support having means thereon for affixation thereof to a central part of the frame; rotatable power input means journaled on the central support and drivingly connectible to the driving member; an arm having an inner end and an outer end and pivoted at its inner end to the central support on an axis parallel to that of the input means so as to be swingable about said axis to position its outer end selectively at one end or the other of the frame; a first outer support disconnectibly secured to the outer end of the arm in either position of said arm and having means for the disconnectible mounting thereof on the respective end of the frame; power output means journaled on the first outer support; controllable power-transmitting means drivingly interconnecting the input and output means; a second outer support positionable at that end of the frame not occupied by the first outer support and having means for the disconnectible mounting thereof on said end of the frame; control means carried by the support and extending across the frame toward and operatively connected to the power-transmitting means; and said first and second supports being equally spaced from the arm pivot so that upon disconnection of the first and second outer supports from the frame and disconnection of the first outer support from the arm, the arm may be swung to the other end of the frame and the first and second outer supports interchanged and re-mounted on the frame respectively at opposite ends of the frame.

4. For a crop-handling machine having a horizontal frame including opposite ends and a centrally located driving member rotatable on a horizontal axis transverse to the frame: selectively positionable auxiliary driving mechanism comprising a central support having means thereon for affixation thereof to a central part of the frame; rotatable power input means journaled on the central support and drivingly connectible to the driving member; an arm having an inner end and an outer end and pivoted at its inner end to the central support so as to be swingable relative to said central support to position its outer end selectively at one end or the other of the frame; an outer support disconnectibly secured to the outer end of the arm in either position of said arm and having means for the disconnectible mounting thereof on the respective end of the frame; power output means journaled on the outer support; power-transmitting means drivingly interconnecting the input and output means; and means at opposite ends of the frame selectively cooperative with the disconnectible mounting means on the outer support, said last named means being equally spaced from the arm pivot so that upon disconnection of the outer support from one position on the frame and disconnection of said outer support from the arm, the arm may be swung to the other end of the frame and the outer support re-mounted on the other end of the frame and re-connected to the outer end of the arm.

References Cited in the file of this patent

UNITED STATES PATENTS

| Number | Name | Date |
|---|---|---|
| 541,565 | Mayer | June 25, 1895 |
| 757,137 | Munro | Apr. 12, 1904 |
| 1,118,116 | Elliot | Nov. 24, 1914 |
| 2,614,433 | Cuckler | Oct. 21, 1952 |
| 2,640,613 | Kuhl | June 2, 1953 |